(12) United States Patent
Räbiger

(10) Patent No.: US 6,436,172 B1
(45) Date of Patent: Aug. 20, 2002

(54) METHOD FOR SEPARATING CONDENSABLE SUBSTANCES FROM GASES OR GAS MIXTURES

(75) Inventor: Norbert Räbiger, Bremen (DE)

(73) Assignee: Universität Bremen, Bremen (DE)

( * ) Notice: Subject to any disclaimer, the term of this patent is extended or adjusted under 35 U.S.C. 154(b) by 0 days.

(21) Appl. No.: 09/831,212

(22) PCT Filed: Oct. 28, 1999

(86) PCT No.: PCT/EP99/08194

§ 371 (c)(1),
(2), (4) Date: May 3, 2001

(87) PCT Pub. No.: WO00/25895

PCT Pub. Date: May 11, 2000

(30) Foreign Application Priority Data

Nov. 3, 1998 (DE) .......................................... 198 50 557

(51) Int. Cl.⁷ .............................................. B01D 53/02
(52) U.S. Cl. ............................. 95/117; 95/126; 95/148; 95/291
(58) Field of Search ........................ 62/93, 94; 203/41, 203/49, DIG. 1; 95/117, 118, 119, 120, 121, 124, 126, 291, 116, 148

(56) References Cited

U.S. PATENT DOCUMENTS

| | | | |
|---|---|---|---|
| 3,511,031 A | * 5/1970 | Ketteringham et al. | |
| 4,146,372 A | 3/1979 | Groth et al. | |
| 4,197,713 A | 4/1980 | Bulang | |
| 4,285,702 A | * 8/1981 | Michel et al. | 95/124 |
| 4,342,569 A | 8/1982 | Hussmann | |
| 5,429,665 A | * 7/1995 | Botich | 95/126 |
| 5,505,825 A | * 4/1996 | Gold et al. | 95/126 |
| 5,669,962 A | * 9/1997 | Dunne | 95/115 |
| 5,729,981 A | * 3/1998 | Markus et al. | 62/3.4 |
| 5,846,296 A | * 12/1998 | Krumsvik | 95/115 |
| 6,336,957 B1 | * 1/2002 | Tsymerman | 95/115 |

FOREIGN PATENT DOCUMENTS

| | | | |
|---|---|---|---|
| DE | 28 43 416 A1 | | 4/1979 |
| DE | 3525237 A | * | 1/1987 |
| DE | 44 30 901 C1 | | 5/1996 |
| DE | 196 13 326 A1 | | 10/1996 |
| DE | 19713609 A1 | * | 10/1998 |
| EP | 00 03 964 A1 | | 2/1979 |
| JP | 56102923 A | * | 8/1981 |
| RU | 2046169 C1 | | 10/1995 |

OTHER PUBLICATIONS

JP 2–131103 A; Patent Abstracts of Japan, C–745, Aug. 2, 1990, vol. 14, No. 356.

Brunauer, Stephen, et al.: Some Remarks about Capillary Condensation and Pore Structure Analysis, Journal of Colloid and Interface Science, vol. 25, S. 353–358, 1967.

Kadlec, O., Dubinn, M.M.: Comments on the Limits of Applicability of the Mechanism of Capillary Condensation, Journal of Colloid and Interface Science, vol. 31, No. 4, Dec. 1969, S.479–489.

* cited by examiner

Primary Examiner—David A. Simmons
Assistant Examiner—Frank M. Lawrence
(74) Attorney, Agent, or Firm—Todd Deveau; Ryan A. Schneider; Troutman Sanders LLP

(57) ABSTRACT

The present invention is a method for separating condensable substances from gases or gas mixtures with the use of porous materials including the steps of employing as adsorbents substances or materials suitable for capillary condensation and cyclically performing the method. The method can be used to separate water from air. The porous materials have a pore structure adapted to the environmental or climatic conditions present at the site of utilization of the method. The step of cyclically performing the method can be performing a plurality of times in succession separation by capillary condensation of the condensable substances in the porous materials and desorption of the condensed substances from the porous materials.

19 Claims, No Drawings

METHOD FOR SEPARATING CONDENSABLE SUBSTANCES FROM GASES OR GAS MIXTURES

CROSS-REFERENCE TO RELATED APPLICATIONS AND CLAIM OF PRIORITY

This is a U.S. National Phase application of PCT/EP99/08914 filed on Oct. 28, 1999, which PCT application claims priority on DE application number 198 50 557.4, filed Nov. 3, 1998.

FIELD OF THE INVENTION

The invention relates to a method for separating condensable substances from gases or gas mixtures. In particular for the separation of water from air, with the use of porous materials.

BACKGROUND OF THE INVENTION

Many parts of the earth, especially arid regions such as the Sahelian zone or numerous torrid deserts located at a considerable distance from the sea, lack reserves of drinking water. Besides transporting drinking water, the only other possibility is to obtain it from moist air. Known in this connection is the direct condensation of air below the dew point and the adsorption of water from zeolites, active charcoal or silica gels, see for example DE-PS 2660 068. Water stored in this manner is extracted from the material by warming and then condensed.

The known methods are not particularly effective in terms of the actual yield of water since the regeneration of the moisture absorbed by the material must overcome high bonding energies or is solely oriented to a daily absorbent filling (see DE 44 30 901 C1 and EP 0003064 A1). Here adsorption occurs mostly at night and desorption by day, with the air being heated directly by resorting to solar collectors or indirectly with the use of heat accumulators. The recovery of water is then conducted by day (EP 0003 964 A1) or at night using a cascade connection (DE 4430901 C1). A further known method for the expenditure of energy in the regeneration of adsorbents is the utilization of electric energy using wall grids or electrodes (DE 196 13 326 A1).

The Method of capillary condensation, long known from the relevant literature (BRUNAUER, Stephen. et. al.: Some Remarks about Capillary Condensation and Pore Structure Analysis. In: Journal of Colloid and Interface Science. Vol. 25, p. 353–358: KADLEC, O., DUBININ: M.M.: Comments on the Limits of Applicability of the Mechanism of Capillary Condensation. In: Journal of Colloid and Interface Science, Vol. 31. No. 4. Dec. 1969, p. 479–489) has so far only been employed for the extraction of solvents from gas (DE 2843416 A1. DE 196 13326 A1) without taking into account its existing potential for improved desorption.

SUMMARY OF THE INVENTION

The object of the present invention is to create a method for separating condensable substances from gases (and gas mixtures) which operates more effectively than the known methods.

The method according to the invention is characterized in that materials or matter suited for capillary condensation are used which are particularly suited to the climate (operating conditions) on site and which permit optimum regeneration yields. The special feature of the invention thus lies in the selection of the appropriate material and its inner structure. Instead of the previously used material, which was basically geared toward adsorption properties, a material is now selected with which it is possible for so-called capillary condensation to attain high volume-specific yields by virtue of shorter regeneration cycles. This also results in matching the capillary structure of the adsorbent with the adsorbate and with the medium (gas) containing the adsorbate or with external conditions.

Condensation proceeds by capillary pressure due to the existing pore radii, with the inner capillary structure to be selected providing an optimum volume-specific water bonding, for example, for the corresponding climatic conditions and high yields through short-time regeneration (more than 6 per night). The bonding forces to be overcome in the regeneration of moisture are thereby considerably weaker than binding by preceding adsorption or undefined capillary condensation. The recovery of drinking water from air can be performed quite effectively with the new method and is no longer limited to a single regeneration per adsorption body and day. Other applications are also conceivable, such as the recovery of solvents.

Preferably a hydrophobing material is employed. This limits the uptake of liquid by adsorption.

The material can be regenerated by using a combination of renewable sources of energy, such as solar energy, photovoltaics, wind energy and/or the supplementary storage of such energy with the appropriate accumulators.

The material exhibits micropores and/or mesopores ranging in size from 4 to 20 Angstrom units or from 20 to 500 Angstrom units, respectively. It is advantageous to use a material having different pore sizes which are optimally suited to the geographical site. In this manner, various air humidities can be accounted for and the optimum conditions for regeneration can be established.

By carefully choosing the right material it is also possible to achieve a selective separation of materials.

Other features of the invention are set forth in the claims and in the remaining description. In the following, the method will be further illustrated by example.

In a method for separating water from atmospheric air—in particular for the recovery of drinking water—in a first phase a current of moist air from the atmosphere, in desert areas preferably at night, is conducted through a pack of microporous material in order to transfer the water moisture contained in the air to the microporous material by means of capillary condensation. Suitable materials for use could be ceramics,
   activated charcoal,
   activated alumina,
   synthetic zeolites,
   adsorber polymers,
   adsorber resins,
   molecular sieves,
   silica gel,
   cellulose materials,
   compounds of the above substances and
   mixtures of the materials.

The above materials can be employed inasmuch as they exhibit a distribution of pores and pore radii suitable for capillary condensation. In particular, the respective mircopores and/or mesopores of a particular size are present. For adapting to the climatic conditions in the Sahelian zone, approximately 60% of the material exhibits pore radii of 40 to 200 Angstroms. The pore radii of the remaining material lie outside of these limits, but preferably between 4 to 500 Angstroms.

In a second phase, the material is heated in order to vaporize the substance. For this purpose, in one embodiment an air current circulated in a closed cycle is warmed with an air heater by means of previously stored solar energy, or wind energy or by instantly generated wind or solar energy, and passed through the pack filled with the material in order to return to the microporous material the energy component which had been released during capillary condensation. In the process, the water vapor bound to the material escapes and is absorbed by the circulating stream of air. The air current thus saturated with water vapor is passed through a condenser contained in the cycle and the water vapor in the air is condensed out.

In another embodiment pursuant to the method according to the invention, the material is electrically heated for vaporizing the substance. This is possible through the use of an electronically conductive material, e.g. using electrically conducting ceramic as the adsorbent. The material can be connected to a voltage source fed by stored solar power. The flow of current in the material can also be generated by induction. In any case, it is advantageous to employ a material with good thermal conductivity.

In another embodiment of the method according to the invention, the substance is heated in the material by microwaves and brought to the vaporization point. In this case, it is advantageous to use a non-metallic material.

Due to the optimum inner structure of the adsorbent material, adsorption and desorption of the substance are preferably carried out in a cyclical manner, for example, multiple times during the night. Also possible and advantageous is the execution of more than 6 cycles at night, with only a portion of the overall adsorption and desorption being realized at any given time. Depending on the inner structure, this portion contains the largest volume-specific water fraction. Thus more than 600 l of water per ton of adsorbent can be recovered per night. The newly won substance (drinking water) is then available at the start of the day.

The recovery of water from an appropriate material (regeneration) requires considerably less adsorbent mass than is the case in the present method involving the desorption of water vapor from conventional zeolites (appropriate for adsorption) or silica gels. In this respect, the material possesses a pore radii distribution which is defined and thus optimized for its particular application (temperature, humidity and air pressure at the site of water recovery).

The material is particularly available in the form of granulates, pellets or packing bodies of a defined structure. Other forms are also possible.

I claim:

1. Method for separating a condensable substance from gases or gas mixtures with the use of a porous material comprising the following steps:
    a. employing a porous material having a pore structure which for capillary condensation is adapted to (i) the environmental or climatic conditions present at the site of utilization (ii) the condensable substance, and (iii) the gases or gas mixtures containing the condensable substance; and
    b. cyclically performing said method until at least a portion of overall adsorption and desorption is realized by performing a plurality of times in succession separation by capillary condensation in the porous material and desorption of the condensed substance from the porous material;
    wherein the separation by capillary condensation in the porous material and desorption of the condensed substance from the porous material are performed only in a region of capillary condensation.

2. Method according to claim 1, wherein cyclically performing said method of step (b) continues until the overall adsorption and desorption is entirely realized.

3. Method according to claim 1, wherein the porous material has micropores and/or mesopores.

4. Method according to claim 1, wherein the porous material is a hydrophilic material.

5. Method according to claim 1, wherein the porous material comprises granulates, pellets, or packing bodies of defined structure.

6. Method according to claim 1, wherein capillary condensation and subsequent regeneration occur cyclically at night, or capillary condensation occurs at night and regeneration by day.

7. Method according to claim 1, wherein for separating water from atmospheric air, in a first phase a current of cool, moist air from the atmosphere is conducted through a pack with microporous or mesoporous material in order to transfer the water moisture contained in the air to the material by means of capillary condensation, that in a second phase an air current is warmed by an air heater by means of in particular previously stored solar energy or wind energy or by directly generated solar or wind energy and passed through the pack filled with the material in order to transfer the water vapor bound in the material to the air current, and that finally the air current thus saturated with water vapor is passed through a condenser and the water vapor in the air is condensed out.

8. Method according to claim 1, wherein the porous material is electrically conductive or has electric conductors.

9. Method according to claim 8, wherein the desorption of the condensed substance from the porous material results from electric heating occurring in the porous material.

10. Method according to claim 1, wherein the desorption of the condensed substance from the porous material occurs by heating one or both the condensed substance and the porous material by means of microwaves.

11. Method according claim 1, wherein approximately 60% of the porous material exhibits pore radii between approximately 40 and 200 angstroms, and that the remaining porous material exhibits different pore radii.

12. Method according to claim 1, wherein approximately 60% of the porous material exhibits pore radii between approximately 40 and 200 angstroms, and that the remaining porous material exhibits pore radii between approximately 4 and 500 angstroms.

13. Method according to claim 1, wherein the porous material is a hydrophobic material.

14. Method for separating a condensable substance from gases or gas mixtures with the use of a porous material comprising the following steps:
    a. employing a porous material having a pore structure which for capillary condensation is adapted to (i) the environmental or climatic conditions present at the size of utilization (ii) the condensable substance, and (iii) the gases or gas mixtures containing the condensable substance; and
    b. cyclically performing said method until at least a portion of overall adsorption and desorption is realized by performing a plurality of times in succession separation by capillary condensation in the porous material and desorption of the condensed substance from the porous material;
    wherein the separation by capillary condensation in the porous material and desorption of the condensed substance from the porous material are performed only in a region of capillary condensation;

the portion of the overall adsorption and desorption realized depending on an inner structure of the porous material—containing the largest volume-specific fraction of condensable substance.

15. Method for recovering water from air with the use of a porous material comprising the following steps:
   a. employing a porous material having a pore structure which for capillary condensation is adapted to (i) the environmental or climatic conditions present at the site of utilization (ii) water, and (iii) the air containing the water; and
   b. cyclically performing said method until at least a portion of overall adsorption and desorption is realized by performing a plurality of times in succession separation by capillary condensation in the porous material and desorption of the water from the porous material; wherein only short-time regenerations are performed, with the separation of water from air being conducted a number of times during the night.

16. Method according to claim 15, wherein the separation of water from air is conducted with more than six cycles in one night.

17. Method according to claim 15, wherein cyclically performing said method of step (b) continues until the overall adsorption and desorption is entirely realized.

18. Method according to claim 15, wherein the porous material comprises granulates, pellets, or packing bodies of defined structure.

19. Method according to claim 15, wherein the separation by capillary condensation in the porous material and desorption of the condensed substance from the porous material are performed only in the region of capillary condensation.

* * * * *